United States Patent Office 2,769,632
Patented Nov. 6, 1956

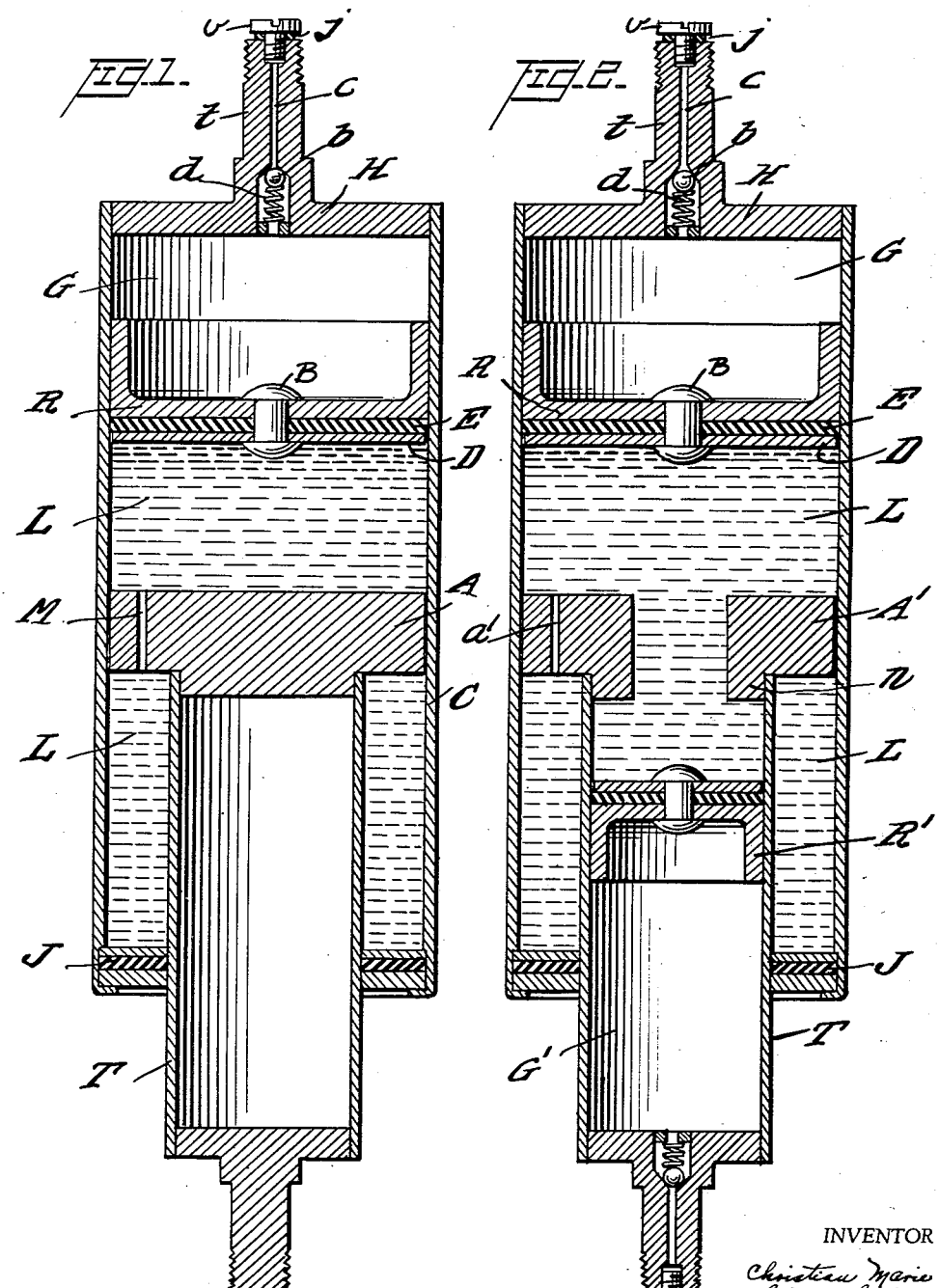

2,769,632

DAMPED PNEUMATIC SPRING

Christian Marie Lucien Louis Bourcier de Carbon, Neuilly-sur-Seine, France

Application October 14, 1952, Serial No. 314,715

Claims priority, application France August 13, 1952

4 Claims. (Cl. 267—64)

The present invention relates to damped pneumatic springs, and has for its general object the provision of a novel and improved spring device of this character intended primarily for the suspension of land vehicles and which is to serve at the same time on the one hand as suspension spring for elastically supporting by means of a cushion of air or compressed gas all or at least a substantial portion of the weight of the vehicle and on the other hand as a suspension shock absorber by means of a hydraulic brake included in the apparatus.

In its preferred embodiments the invention contemplates the provision of a direct-acting combined suspension spring and shock absorber comprising a cylinder adapted to be connected to one of the members the relative movement of which is to be controlled, and a piston adapted to be connected to the other member. The piston is disposed within the working chamber in the cylinder and moves in a body of hydraulic fluid, a portion of the working fluid being displaced from one side of the piston to the other through suitable openings therethrough upon relative reciprocating movement of the primary elements. The working chamber of the cylinder upon one side of the piston is divided into two parts by a floating partition which marks the plane of demarcation between the working chamber proper containing the hydraulic fluid and a superposed chamber containing air under pressure.

In accordance with the provisions of the invention, there have also been developed certain optimum ratios between the dimensions of parts of the device. For example, for the purpose intended, the diameter and cross-sectional area of the working piston rod, which passes through a packed opening in one end of the cylinder, is considerably greater than the rods of conventional shock absorbers.

The invention is also concerned with the control of the temperature of the body of cushioning air or gas, the provision of a supplemental variable capacity gas chamber within the hollow working piston rod, and the provision of means for limiting the expansion of said supplemental chamber.

This application is a continuation-in-part of my co-pending application Serial No. 99,796 filed June 17, 1949, now Patent No. 2,721,074, granted October 18, 1955.

Other objects and features of novelty will be apparent from the following specification when read in connection with the accompanying drawings in which certain embodiments of the invention are illustrated by way of example.

In the drawings:

Figure 1 is a view in longitudinal section of a combined suspension spring and shock absorber constituting one embodiment of the invention; and Figure 2 is a similar view depicting another embodiment of the invention.

The apparatus shown in Figure 1 consists essentially of a first cylinder C divided into two parts by a freely-movable partition piston R which is sealed by gasket E and can freely slide in axial directions. On the one side of this piston between the piston R and the end wall casting H of the cylinder there is imprisoned a volume G of gas or compressed air under a pressure $p$; on the other side of this piston between piston R and the gasket J, forming the opposite end wall of the cylinder, there is a liquid L which is placed under compression by the piston R. Due to the gasket J, a rod T of rather large cross-section $s$ and preferably hollow, penetrates into and may slide axially within the cylinder C without there being any leakage of liquid. This rod T bears at its end a working piston A which does not have a tight fit with the wall of the cylinder and which slides in cylinder C and is provided with restricted passageways M of section $a$ or valve controlled passageways, so as to brake the movements of the rod T with respect to the cylinder C.

The operation of the apparatus is very simple: under the action of the pressure $p$ of the compressed air, which pressure the floating but tightly fitting piston R transmits in full to the liquid L, the rod T of cross-section $s$ tends to move out of the cylinder C with a force $f=p.s$. This force $f$ plays the same part as the reaction of a compressed coil spring and therefore it permits the apparatus to elastically support the weight of the vehicle when the apparatus, after having been inflated to a suitable pressure $p$, is used under the same conditions as a coil spring working in compression.

Furthermore, the relative movements of the cylinder C and of the rod T are braked by the reaction of the liquid L on the piston A which assures the energy-dissipating role of the suspension shock absorber.

As an accessory to the principal features, an inflation valve is provided in the end H of cylinder C and the particularly suitable arrangement shown constitutes part of the present invention and is valid for any apparatus of this type, and in particular for any pneumatic spring or any suspension shock absorber. The arrangement consists, as shown in Figs. 1 and 2, in housing this inflation valve in the center of the end casting H of the cylinder, inside the stem $t$ which serves to fasten the cylinder C either to the frame or to the axle. The fastening stem $t$ which is provided with a thread or a swivel, is for this purpose pierced by a channel $c$. This channel may terminate at its inner end in an inflation valve consisting for instance of a ball $b$ and a coil spring $d$; it may be closed at its upper end after inflation either by welding or by means of a screw $v$ which compresses a stationary sealing joint $j$.

In order to reduce the friction of the movable gasket E of partition piston R as much as possible—which is desirable for the satisfactory operation of the apparatus—this gasket preferably consists of at least one flat rubber disc perforated at its center and of a thickness of at least 2 mm., the difference between its outer radius and its inner radius being relatively large with respect to its thickness. This gasket disc E may be housed in a groove of the piston or attached to the bottom of the piston by a metal disc D which in turn is fastened by a central rivet or screw B.

This general arrangement has great technical advantages. Such an apparatus, which is of particularly simple design, compact, and inexpensive, is able as a matter of fact to act by itself both as a suspension spring and as a shock absorber, functioning under the best technical conditions for this type of apparatus.

Due to the tightly fitting piston R and particularly to the sealing disc E, the compressed air G is rather well heat insulated from the liquid L. This detail is essential for the satisfactory operation of such apparatus. As a matter of fact, as air is extremely expandable as a function of temperature, any change in the temperature of the compressed air G will result in a variation of the height of the frame with respect to the ground. These temperature variations must, therefore, be small as possible. Now, the operation of the working piston A of the shock absorber is accompanied by a rather large release of heat which warms up the liquid L. It is therefore necessary to use a piston R which thermally insulates the liquid L from the compressed air G and this constitutes an important part of the present invention. The rubber disc E used to assure the tightness of the piston P also assumes this role of heat insulator.

Another aspect of the present invention resides in the dimensioning of such damped pneumatic springs. The present invention has shown the seriousness of the drawback of the variations of the height of the frame with respect to the ground resulting from temperature variations, when a pneumatic spring operating in accordance with the above principle is used. It has been pointed out that these variations in height are proportional to the quotient $V/s$ of the total volume $V$ of the compressed air taking part in the suspension when the latter is in repose, by the section $s$ of the rod A. Theoretical considerations which have been confirmed by experience have shown that in order that these variations in height of the frame shall not constitute a defect which will make the apparatus valueless, it is desirable that $V/s \leqslant 20$ when the volume $V$ is expressed in cubic centimeters and the section $s$ of the rod T is expressed in square centimeters.

Furthermore, the present applicant has also shown that in order that a pneumatic suspension be sufficiently comfortable for use in a vehicle, it is necessary that we have approximately $$\frac{V}{s} \geqslant 10$$

In order to satisfy these various technical desiderata, the quotient $V/s$ must therefore fall between rather narrow limits inasmuch as we must have $$10 \leqslant \frac{V}{s} \leqslant 20$$

when the volume $V$ of the compressed air participating in the suspension is in cubic centimeters and the section $s$ of the rod T is in square centimeters.

Very probably an optimum value for $$\frac{V}{s}$$

would be in the neighborhood of 16.

As a matter of fact, these considerations as to dimensions are only valid when the shock absorber is located directly between the axle and the frame so that the piston moves 1 cm. in the cylinder when the frame itself moves 1 cm. with respect to the axle.

When the manner of locating the shock absorber is such that axle must move $x$ cm. with respect to the frame for the piston to move 1 cm., a mechanical analysis of the problem which has been confirmed by experimental results shows that in order to have a damped pneumatic spring which satisfies the various technical desiderata set forth above, it is necessary to have the double relationship $$\frac{10}{x} \leqslant \frac{V}{s} \leqslant \frac{20}{x}$$

Every vehicle suspension using a pneumatic spring consisting of two tubes sliding within each other and constructed and arranged in such a manner as to satisfy the above double condition will therefore be within the scope of the present invention.

A modification of the present invention, making it possible to decrease the volume of the compressed air chamber G in cylinder C, and therefore to decrease the space occupied by the apparatus or to increase the useful stroke of the piston A consists in using, as shown in Figure 2, a second compressed air chamber G' inside rod T, this chamber being separated from the liquid L by a floating piston R' which is exactly analogous to the piston R.

This combination of two compressed air chambers G and G' presents the further advantage of improving the characteristics of the curve giving the reaction $f$ of the pneumatic spring as a function of the distance by which the rod T is introduced into the cylinder C, when care is taken at the beginning to inflate the second chamber G' to an initial pressure $p'$ higher than the initial pressure $p$ of the chamber G so that the piston R' within the rod T is first caused to come against the stops $n$ at the end of its stroke and to begin moving only after a given penetration of the rod T, when the pressure $p$ has become equal to the pressure $p'$ so that the second chamber only acts toward the middle of the stroke of the piston A'.

It is understood that various changes and modifications may be made in the embodiments illustrated and described herein without departing from the scope of the invention as determined by the subjoined claims.

Having thus described the invention, what is claimed as new and desired to be secured by Letters Patent is:

1. A combined damped pneumatic spring and hydraulic braking device adapted to function as a suspension spring and shock absorber between two relatively movable members, said device comprising, in combination, an airtight and liquid-tight casing adapted to be connected to one of said members and containing a substantially cylindrical working chamber; a piston disposed in said chamber and adapted to reciprocate therein upon relative movement of the members, a piston rod of enlarged diameter having an end fixed to said piston and its opposite end secured to the other of said members, said rod passing through a packed opening in one end wall of said casing; a body of working liquid in said working chamber within which said piston moves, and means for bypassing liquid in restricted flow past said piston in either direction as the piston moves in the chamber; a body of gaseous fluid within said casing at the opposite end thereof, said gaseous fluid being under a permanent high compression and exerting pressure upon the body of working liquid, the pressure in the body of gaseous fluid being increased by the displacement of the working liquid upon entrance of successive increments of the enlarged piston rod into the casing upon the compression stroke of the device and diminished upon withdrawal of such increments, and a floating partition element fitted snugly with the side walls of the working chamber and separating the two bodies of fluid, said partition being disassociated operatively from any other operating part of the shock absorber, the piston rod being hollow thus providing a supplemental chamber, a wide opening through the piston to afford substantially unrestricted flow of working liquid into the supplemental chamber, a floating partition disposed in said supplemental chamber and bounding the body of liquid therein, and a body of gaseous fluid in the remote end portion of said supplemental chamber.

2. The device as set forth in claim 1 in which inflating means are provided for said bodies of gaseous fluid adjacent the remote ends of the casing and the piston rod.

3. A combined damped pneumatic spring and hydraulic braking device adapted to function as a suspension spring and shock absorber between two relatively movable members such as the chassis of a vehicle and the wheel mounting thereof, said device comprising, in combination, an air-tight and liquid-tight casing adapted to occupy a substantially vertical position and to be connected to the chassis and containing a substantially cylindrical working chamber, a piston disposed in said chamber and adapted to reciprocate therein upon relative movement of the members, a piston rod of enlarged diameter having an end fixed to said piston and its opposite end secured to the wheel mounting, said rod passing through a packed opening in the lower end wall of said casing; a body of working liquid in said working chamber within which said piston moves, and means for bypassing liquid in restricted flow past said piston in either direction as the piston moves in the chamber; a body of gaseous fluid within said casing at the upper end thereof, said gaseous fluid being under a permanent high compression and exerting pressure upon the body of working liquid, the pressure in the body of gaseous fluid being increased by the displacement of the working liquid upon entrance of successive increments of the enlarged piston rod into the casing upon the compression stroke of the device and diminished upon withdrawal of such increments, a floating partition element fitted snugly with the side walls of the working chamber and separating the two bodies of fluid, said partition being disassociated operatively from any other operating part of the shock absorber, the piston rod being hollow thus providing a supplemental chamber, a wide opening through the piston to afford substantially unrestricted flow of working liquid into the upper end of the supplemental chamber, a floating partition similar in construction and arrangement to the first named partition disposed in said supplemental chamber and bounding the body of liquid therein, and a body of gaseous fluid in the lower end portion of said supplemental chamber.

4. The device according to claim 3 in which stops are provided in the hollow piston rod, and the body of gaseous fluid in the end portion of the supplemental chamber is compressed to a higher degree than the first named body of gaseous fluid, and the second named floating partition moves to its limit against said stops before the first-named partition begins to move.

References Cited in the file of this patent

UNITED STATES PATENTS

| | | |
|---|---|---|
| 1,967,641 | Wallace | July 24, 1934 |
| 2,045,027 | Sanford | June 23, 1936 |
| 2,093,259 | Wightman | Sept. 14, 1937 |
| 2,346,667 | Dowty | Apr. 18, 1944 |
| 2,364,823 | Schnell | Dec. 12, 1944 |
| 2,451,171 | Mullen | Oct. 12, 1948 |
| 2,554,581 | Levy | May 29, 1951 |
| 2,564,790 | Orloff et al. | Aug. 21, 1951 |

FOREIGN PATENTS

| | | |
|---|---|---|
| 208,329 | Great Britain | Dec. 20, 1923 |
| 777,611 | France | Dec. 5, 1934 |